Patented Feb. 2, 1926.

1,571,862

UNITED STATES PATENT OFFICE.

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE.

PREVENTION OF FUEL KNOCK.

No Drawing. Continuation of application Serial No. 419,763, filed October 26, 1920. This application filed September 18, 1923. Serial No. 663,505.

*To all whom it may concern:*

Be it known that I, THOMAS MIDGLEY, Jr., a citizen of the United States of America, residing at Dayton, county of Montgomery, and State of Ohio, have invented certain new and useful Improvements in the Prevention of Fuel Knock, of which the following is a full, clear, and exact description.

The present invention relates to the prevention of the so-called fuel knock in internal-combustion engines.

In its preferred form, it relates more specifically to a composition of matter for injection or addition to the fuel mixture of an internal-combustion engine before the combustion of the same.

This application is a continuation of my application Serial No. 419,763, filed October 26, 1920.

In application, Serial No. 553,040, filed April 15, 1922, there is described a method and apparatus for preventing knock in internal-combustion engines, wherein aniline and other anti-knock materials are injected into the fuel-air mixture prior to its combustion.

In application Serial No. 553,040, filed April 15, 1922, there is described the use of these materials without specific preparation. These materials however, are somewhat unsatisfactory under certain conditions and it is the object of the present invention to provide a composition of matter containing anti-knock material which will have satisfactory physical properties under all ordinary operating conditions.

Aniline, which is the most readily available anti-knock material, freezes when cooled to temperatures as low as about —6° C. and consequently would not give satisfactory operation at temperatures approximating this point.

In order to overcome this tendency of aniline to freeze, a substance is added which will lower the freezing point of the aniline or form a mixture which has a sufficiently low freezing point. Such a substance should preferably be one which does not interfere with the operation of the engine or with the function of the aniline as an anti-knock material. A satisfactory material for this purpose is ortho toluidine, which is itself an anti-knock material. Another suitable material for the purpose is xylidine, which is also an anti-knock material. A relatively small proportion of either one or a mixture of these two materials will reduce the freezing point of aniline, or the mixture of aniline with the addition, to temperatures considerably below the freezing point of the aniline by itself.

This mixture of materials however becomes too viscous to allow its use in injectors at these low temperatures, and it becomes desirable to add a material which will reduce the viscosity and which will reduce the rate of increase in viscosity on cooling.

A material which is satisfactory for this purpose is unsaturated gasoline (unsaturated in hydrogen, for example, the olefinic series including decylene and monylene) and the preferred unsaturated gasoline is one having an unsaturation of approximately 38 to 40%.

In cases where the anti-knock liquid is to be used under conditions in which the temperature never reaches a point below about 0° C., it will be found that the mixture of aniline and unsaturated gasoline will give satisfactory operation, however if this mixture without the blending agent is reduced to temperatures as low as —6 or —7° C. the aniline will begin to separate out.

The preferred composition and one that has been found to possess the desired physical and chemical characteristics within a temperature range of approximately 30° C. to approximately —30° C. is composed of aniline, six parts; unsaturated gasoline (having substantially 38 to 40% unsaturation) three parts; and the blending agent (consisting of substantially equal parts of ortho toluidine and xylidine) two parts.

Instead of the mixture of equal parts of ortho toluidine and xylidine as indicated in the last paragraph, being used as a blending agent, either one of these materials may be used.

While the specific proportions mention aniline as the anti-knock material to be used, it should be understood that other anti-knock materials may be substituted therefor, such as other aromatic amines and that other blending agents may be substituted for the blending agent mentioned. Such blending agents as amyl alcohol or acetate, cumidene, or methyl aniline give very good results. Further, other viscosity reducing liquids may be substituted for the unsaturated gasoline and such materials as alcohol, benzol toluol, solvent naphtha, and others have been used with entire satisfaction. These compounds belonging to different chemical classes are called, herein, aniline addition substances of the viscosity reducing type. Therefore, where in the claims the expression "anti-knock materials," "blending agent," "viscosity reducing material" have been used, these expressions are intended to cover not only the materials specifically mentioned, but also these and any other materials which may be substituted therefor, having the same function.

The mixture above described will remain a homogeneous liquid at the lowest temperature mentioned, its components will not separate on cooling, it will not form a jelly throughout the temperature range ordinarily encountered and its viscosity will not materially increase. The change in temperature from 26° C. to 0° C. of this mixture increases the viscosity only sufficiently to increase the time required for a given amount of it to run through a given size orifice, about 6%. The viscosity of aniline changes with the same temperature change sufficiently to increase its time of running through the same sized orifice about 18%.

The addition of the blending agent is not required unless the material is to be subjected to temperatures below 0° C., although its presence is not objectionable but is even advantageous.

The proportion of gasoline in the above mixture may be varied with a consequent variation in the viscosity change. If less gasoline is used in the mixture, the viscosity will increase at a somewhat greater rate.

In the above description, the proportions given are parts by volume.

It should be noted that the invention is not limited to the exact proportions given as these may be varied without departing from the spirit of the invention and the exact proportions will depend to some extent upon the conditions under which the material is to be used.

If the lowest temperature to which the operation will be subjected its several degrees above 0° C., it will not be necessary to use the blending agent and a somewhat smaller proportion of the unsaturated gasoline may also be used, although unsaturated gasoline is not objectionable but is of an advantage in the mixture, in that, by increasing the bulk and fluidity of the mixture, more exact regulation of the flow of the mixture and better distribution of the anti-knock material may be obtained.

While the specific composition herein shown and described, constitutes a preferred form of embodiment of the invention, it is to be understood that other forms might be adopted, all coming within the scope of the claims which follow.

I claim:

1. A composition of matter comprising aniline, unsaturated gasoline, and a blending agent.

2. A composition of matter comprising aniline, six parts; unsaturated gasoline of about 38 to 40% unsaturation, three parts; and a blending agent for the aniline and gasoline, two parts.

3. A composition of matter comprising aniline mixed with about half its volume of unsaturated gasoline together with a blending agent comprising ortho toluidine.

4. A composition of matter comprising aniline, and unsaturated gasoline.

In testimony whereof I hereto affix my signature.

THOMAS MIDGLEY, Jr.